July 26, 1932. G. M. M. GRANT 1,868,744
PISTON RING
Filed May 8, 1931

Inventor
Gerald M. M. Grant
By
Attorney

Patented July 26, 1932

1,868,744

UNITED STATES PATENT OFFICE

GERALD M. M. GRANT, OF LOS ANGELES, CALIFORNIA

PISTON RING

Application filed May 8, 1931. Serial No. 535,814.

My invention relates to piston rings and more particularly to that type of piston or compression ring which has an auxiliary spring in the rear thereof to increase its sealing bearing against the wall of the cylinder.

It is known to provide rings with springs for forcing the ring outwardly and downwardly to more perfectly seal the joint between the ring and the cylinder wall and between the ring and the bottom of the groove in which the ring is placed, and also to use rings to press outwardly only, such rings being placed in the back of the groove in the piston, and, if said ring is provided with holes or slots therethrough for the passage of oil, the spring interferes with such openings.

I have discovered that by providing a spring receiving recess in the upper, inner corner of a piston ring, that the spring has an adequate support for its bottom edge and that its tension is outwardly against the upper part of the ring, so that the upper outer corner of the ring has a firmer bearing against the wall of the cylinder than has the lower outer corner of said ring, and inasmuch as the compression and explosion action is exerted somewhat upon the upper edge of the piston ring. which extends slightly beyond the surface of the piston, there is an advantage in increasing the pressure contact of the upper corner of the ring against the wall of the cylinder and at the same time leave the lower edge or corner of the ring a little less tight in its engagement with the wall of the cylinder as it moves down.

By this arrangement, I am also able to leave sufficient clearance in the lower half of the ring to provide the openings or slots for the oil to be directed therethrough, where that type of ring is used. It makes it possible for me to use such an auxiliary spring in connection with my improved ring in which there is an outwardly opening annular channel in the ring to receive oil from the cylinder wall, with outlets through the back or inside of the ring and thence through the piston wall to the inside of the piston and thence to the crank case where the oil picked up is again returned.

In order to explain my improved piston ring, I have illustrated the same on the accompanying sheet of drawings, which I will now describe.

Figure 1:
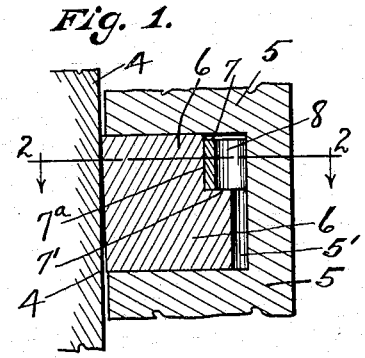
Figure 1 is a fragmentary sectional view through a cylinder wall, piston, piston ring and spring, showing one embodiment of my invention.
Figure 2:
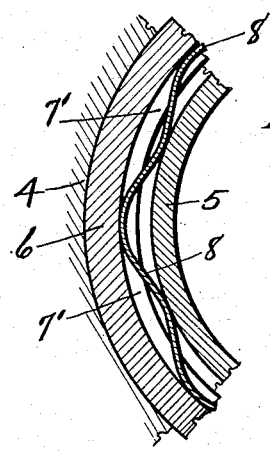
Figure 2 is a sectional view taken on the line 2—2 of Fig. 1.

Referring first to Fig. 1, 4 designates the cylinder wall, 5 the piston and 6 a piston ring, all shown in enlarged or exaggerated form. The piston ring 6 is provided in its inner upper corner with a spring-receiving recess 7, the bottom wall 7′ of which is horizontal, or parallel with the bottom of the groove 5′ in the piston, while the other wall 7ª of said recess is vertical, or parallel with the inner wall of the groove 5′. This spring-receiving recess, being placed at the inner, upper corner of the ring, makes it possible to place a spring member therein to exert pressure outwardly against the upper part of the ring, thus increasing the pressure of the upper outer corner of the ring against the wall of the cylinder. In Fig. 1, I have shown an undulating form of spring, designated 8, which rests edgewise upon the bottom wall 7′ of said recess. This is also seen in Fig. 2, showing how the spring is supported upon said bottom or horizontal wall 7′, and bears outwardly against the top of the piston ring and inwardly against the back or inside of the groove 5′.

In Fig. 1, which is enlarged, it will be seen how the top part of the piston ring is pressed outwardly slightly more than the bottom part thereof, thus forming a little tighter engagement to take the force of the explosion or of the compression.

Figure 3:
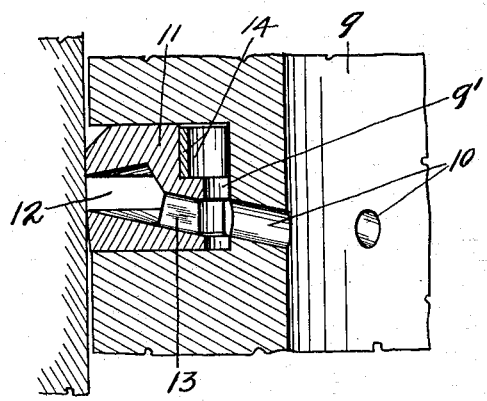
Figure 3 is another sectional view showing how my invention can be embodied in a piston ring having therein an oil-receiving chamber, with drain outlets through the wall of the piston.

Another advantage of this spring receiving recess in the upper inner corner of the ring is shown in Fig. 3, in which I have shown a type of ring having an oil-receiving recess therein. In this figure, the piston 9, has the groove 9', with the drain outlets, 10, 10, through the inside of the piston. The piston ring 11, has the oil receiving channel 12, with outlet from its rear or inner side, designated 13, in register with the outlets 10. By placing the spring-receiving recess in the upper inner corner, as I propose, it is possible to provide an effective spring pressure for the ring and still leave plenty of room for the drain outlets, without the spring interfering therewith or covering such outlets. An undulating form of spring 14 is shown, as in the other application of the invention. It will be understood, of course, that any effective type of spring can be used in the spring-receiving recess in the upper, inner corner of the ring.

Thus I have provided an improved piston ring with a spring-receiving recess in its inner upper corner and so positioned that a spring therein will bear outwardly at the upper part of the ring to increase the pressure of the outer upper corner thereof against the cylinder wall, and also to provide such an arangement that a piston ring having an oil receiving channel therein can have the outlets from the inner side of such channel through the ring without coming into the field of the supplemental spring.

I do not limit my invention, however, to the exact showing made for descriptive purposes, except as I may be limited by the hereto appended claims.

I claim:

1. In combination with a piston having a piston ring groove therein, of a piston ring adapted for said groove and provided in its inner, upper corner with a spring-receiving recess, the bottom wall of which is horizontal and supports a spring edgewise thereon, said ring having drain openings therethrough below said recess, and an undulating spring member set edgewise upon said bottom wall and bearing outwardly against the upper part of said piston ring, whereby the upper outer corner of said ring has increased pressure against the cylinder wall.

2. In combination with a cylinder and piston therein with a ring groove around said piston, of a piston ring adapted for said groove and having in its inner, upper corner a spring-receiving recess, the bottom wall and the outer wall of which recess are at right angles to each other, said ring having an oil collecting channel in its outer face with drain ports therefrom through said ring below said recess, and a spring seated upon the bottom wall of said recess and bearing outwardly against the outer wall thereof, whereby the upper part of said ring has increased pressure against the cylinder wall.

3. In combination with a cylinder and piston therein with a ring groove around said piston, of a piston ring adapted for said groove, said ring having an oil-receiving channel therein with a restricted inlet thereto in its outer face and with drain outlets from said channel through the inner wall of said ring to the groove in the piston, said ring having in its inner, upper corner, above said drain outlets, a spring-receiving recess having its bottom wall parallel with the bottom of the groove to form a support for a spring, and a spring of undulating form supported upon said bottom wall and bearing outwardly against the top portion of said ring to increase its bearing against the cylinder wall at its upper outer corner.

Signed at Los Angeles, Los Angeles County, California, this 2nd day of May, 1931.

GERALD M. M. GRANT.